(12) United States Patent
Akselrod et al.

(10) Patent No.: US 9,917,806 B2
(45) Date of Patent: Mar. 13, 2018

(54) METHOD AND A SYSTEM FOR EMAIL ADDRESS VALIDATION

(71) Applicant: INTERNATIONAL BUSINESS MACHINES CORPORATION, Armonk, NY (US)

(72) Inventors: Ben Z. Akselrod, Givat Shmuel (IL); Anthony Di Loreto, Markham (CA); Steve McDuff, Markham (CA); Kyle D. Robeson, North York (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/662,819

(22) Filed: Jul. 28, 2017

(65) Prior Publication Data

US 2017/0374009 A1 Dec. 28, 2017

Related U.S. Application Data

(63) Continuation of application No. 15/190,600, filed on Jun. 23, 2016.

(51) Int. Cl.
*G06F 15/16* (2006.01)
*H04L 12/58* (2006.01)
*H04L 29/08* (2006.01)
*H04L 29/06* (2006.01)

(52) U.S. Cl.
CPC ............ *H04L 51/30* (2013.01); *H04L 29/06* (2013.01); *H04L 51/28* (2013.01); *H04L 63/0428* (2013.01); *H04L 63/0435* (2013.01); *H04L 67/18* (2013.01); *H04L 67/327* (2013.01); *H04L 51/20* (2013.01); *H04L 63/20* (2013.01)

(58) Field of Classification Search
CPC ....... H04L 29/06; H04L 67/18; H04L 67/327; H04L 51/20; H04L 63/0435; H04L 63/0428; H04L 63/20
USPC ........................................................ 709/206
See application file for complete search history.

(56) References Cited

U.S. PATENT DOCUMENTS

| | | |
|---|---|---|
| 8,271,598 B2 | 9/2012 | Guy et al. |
| 8,316,100 B2 | 11/2012 | Essenmacher et al. |
| 8,756,284 B2 | 6/2014 | Murphy et al. |
| 8,819,152 B2 | 8/2014 | Downing |
| 9,002,941 B2 | 4/2015 | Carrigan et al. |
| 2010/0057859 A1 | 3/2010 | Shen et al. |
| 2011/0078587 A1 | 3/2011 | Guy et al. |
| 2012/0089692 A1 | 4/2012 | Stoddard et al. |
| 2012/0259928 A1 | 10/2012 | Deshpande et al. |
| 2015/0143255 A1 | 5/2015 | Agrawal et al. |

OTHER PUBLICATIONS

Hu et al., "Towards Building Effective Email Recipient Recommendation Service", 2012 IEEE International Conference on Service Operations and Logistics, and Informatics (SOLI), Jul. 8-10, 2012, Copyright 2012 IEEE, pp. 398-403.

(Continued)

*Primary Examiner* — Kyung H Shin
(74) *Attorney, Agent, or Firm* — Michael O'Keefe

(57) ABSTRACT

A device identifies an email address of a recipient listed in an email. The device determines whether the email address is erroneous and based on determining that the email address is erroneous, the device displays a recommended email address to a user.

1 Claim, 3 Drawing Sheets

(56) References Cited

OTHER PUBLICATIONS

Zilberman et al., "Analyzing Group Communication for Preventing Data Leakage via Email", 2011 IEEE International Conference on Intelligence and Security Informatics (ISI), Jul. 10-12, 2011, Copyright 2011 IEEE, pp. 37-41.
IBM: List of IBM Patents or Patent Applications Treated As Related (Appendix P), Aug. 21, 2017, pp. 1-2.
Akselrod et al., Pending U.S. Appl. No. 15/190,600, filed Jun. 23, 2016, titled: Method and a System for Email Address Validation, pp. 1-25.

METHOD AND A SYSTEM FOR EMAIL ADDRESS VALIDATION

FIELD OF THE INVENTION

The present invention relates generally to email address validation, and more particularly to validating the intended recipients' email addresses by analyzing the user's mailbox and corporate email directory.

BACKGROUND

An email address identifies specific email mailbox to which the message is to be delivered. An email address is made up of a case insensitive local part, a "@" symbol, and a domain part.

An email validation and verification is generally performed by the application programming interface (API) for syntactical correctness and domain name verification. However, that does not always guarantee accurate results. To improve the validation process, identity validation is performed by requesting a user to provide additional information about the recipient, such as recipient's phone number, address, or by sending a special hyperlink to a previously defined email address.

SUMMARY

Embodiments of the present invention provide a system, method, and program product for an email address validation. A device identifies an email address of a recipient listed in an email. The device determines whether the email address is erroneous and based on determining that the email address is erroneous, the device displays a recommended email address to a user.

DETAILED DESCRIPTION

Figure 1:
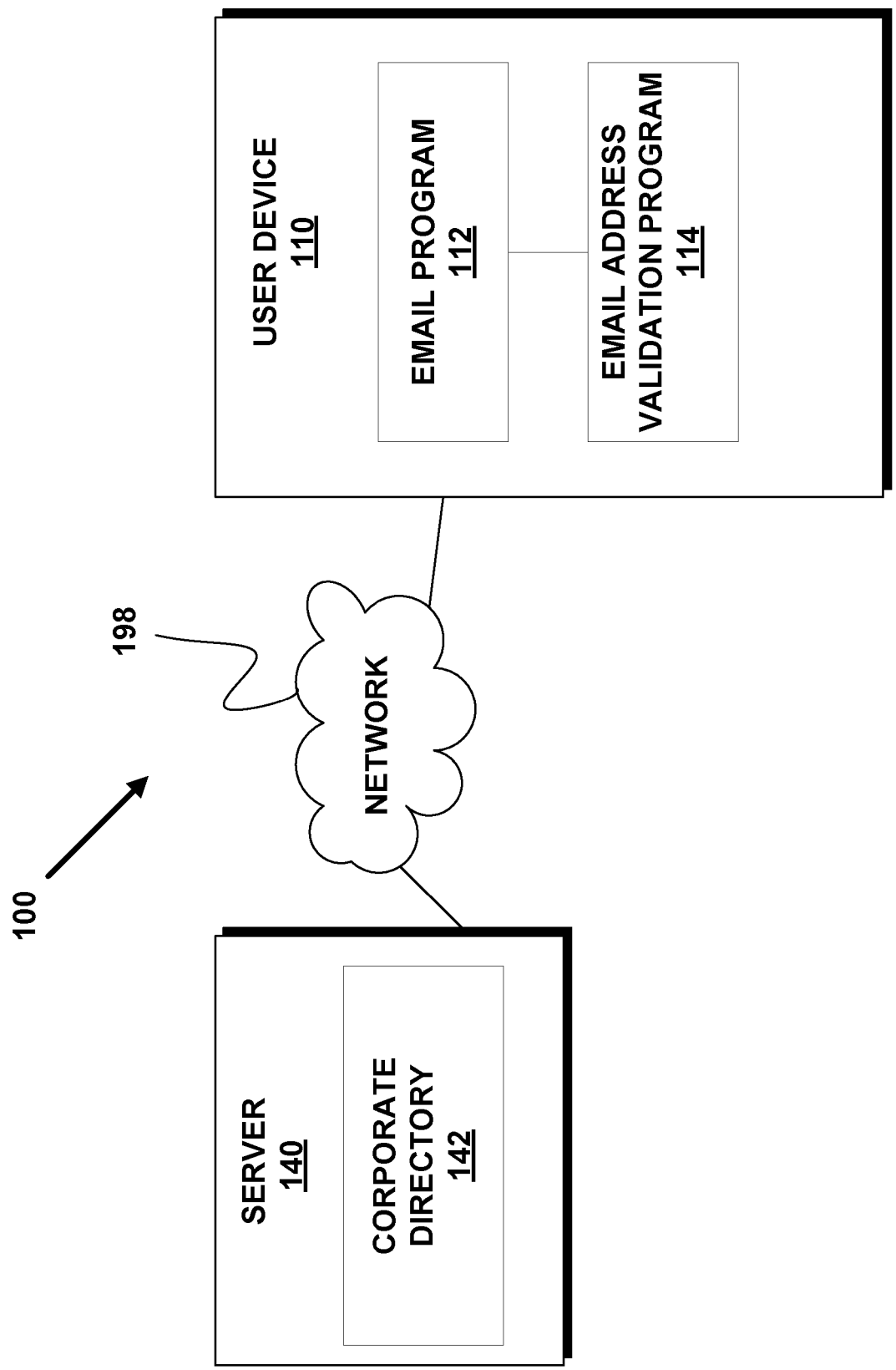
FIG. 1 illustrates an email validation system, in accordance with an embodiment of the invention.

FIG. 1 illustrates an email address validation system 100, in accordance with an embodiment of the invention. In an example embodiment, email address validation system 100 includes a user device 110 and a server 140, interconnected via network 198.

In accordance with an embodiment of the invention, network 198 is the Internet, representing a worldwide collection of networks and gateways to support communications between devices connected to the Internet. Network 198 may include, for example, wired, wireless or fiber optic connections. In other embodiments, network 198 may be implemented as an intranet, a local area network (LAN), or a wide area network (WAN). In general, network 198 may be any combination of connections and protocols that will support communications between server 140 and user device 110.

According to an example embodiment, server 140 stores and operates a corporate directory 142, which contains employees' information of an organization. Server 140 may be a web server, file server, desktop computer, or any other electronic device or computing system capable of receiving and sending data to and from other computing devices such as user device 110 via network 198. Although not shown, optionally, server 140 may comprise a cluster of servers. In an exemplary embodiment, server 140 is a computing device that is optimized for the support of multiple network requests related to accessing, searching and updating the corporate directory information.

In the example embodiment, corporate directory 142 is maintained on server 140, and may be stored in the format of a database that allows access, search, and update by a program running on a user device 110. Corporate directory 142 includes detailed employee information that is relevant to a particular corporation such as the name of an employee, an ID number of an employee, an address of an employee, current and previous roles of an employee in the company, an email address of an employee, current and previous job title of an employee, phone number of an employee, photograph of an employee and any additional information that the employer needs for the operation of his business.

In the example embodiment, user device 110 includes email program 112 and email address validation program 114. User device 110 may be a desktop computer, a notebook, a laptop computer, a tablet computer, a handheld device, a smart-phone, a thin client, or any other electronic device or computing system capable of receiving and sending emails to and from other computing devices, and receiving data related to the email addresses, such as accessing and searching the corporate directory 142 stored on the server 140 via network 198.

According to an embodiment, email program 112 is a software program capable of receiving, sending, and displaying email information to the user. In addition, email program 112 may access the corporate directory 142 on server 140 via network 198. In another embodiment, email program 112 may be located on server 140 or another server in network 198 and render the information to the user device 110.

In the example embodiment, email address validation program 114 (hereinafter "validation program") is a software program that is capable of identifying user intended recipients' email address(es) entered by the user, and validating them based on email content, corporate directory information, and content of the previous emails stored in user's email folder. In the example embodiment, the validation program is an add-on to email program 112. In other embodiments, the validation program may be either an integration software or a standalone software located on either server 140 or on other servers. The validation program is in communication with user device 110 via network 198. The operations and functions of the validation program are described in further details below with regard to FIG. 2.

Figure 2:
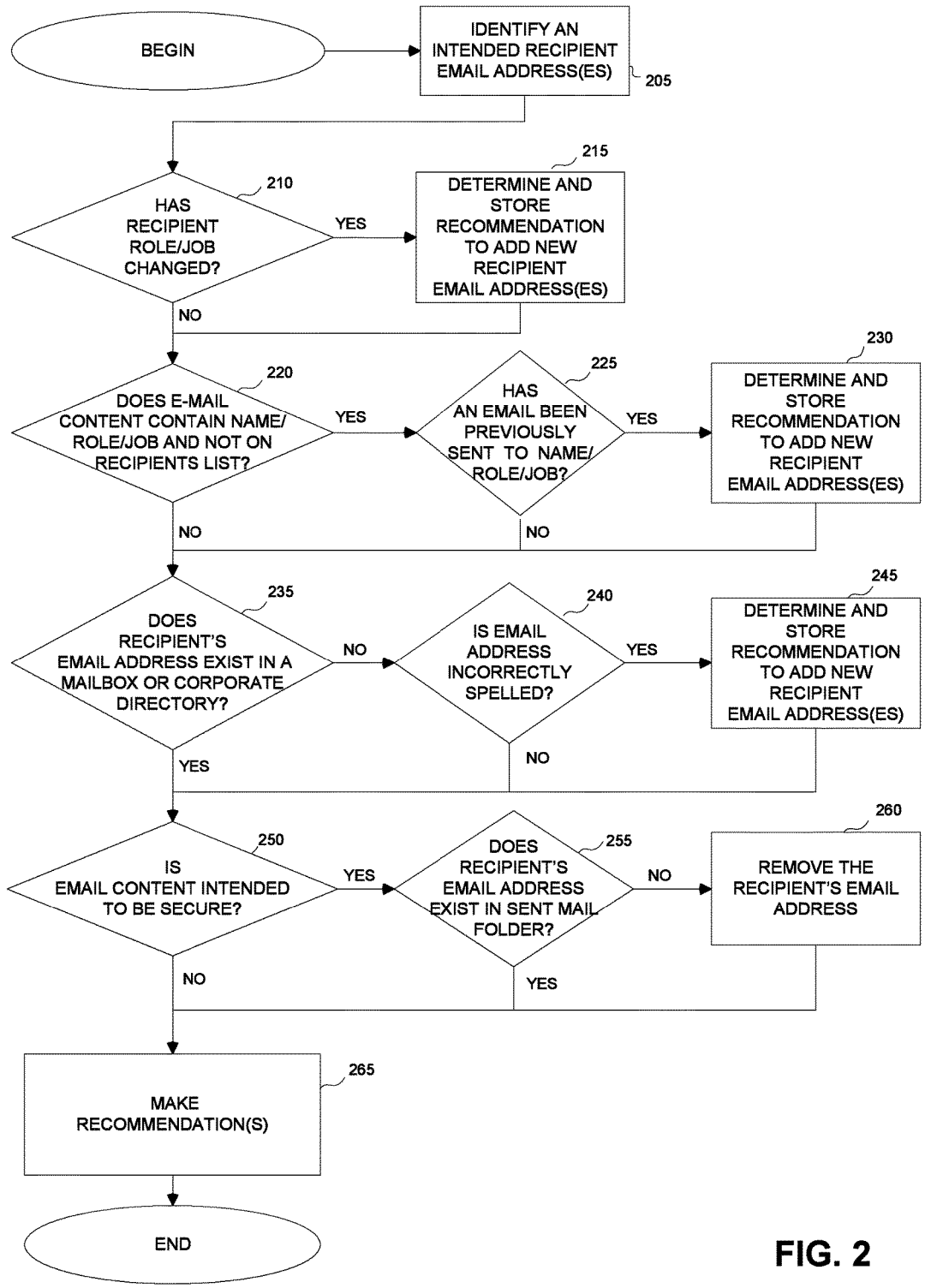
FIG. 2 is a flowchart illustrating the operations of an email address validation program of FIG. 1, in accordance with an embodiment of the invention.

FIG. 2 is a flowchart illustrating the operations of the validation program of FIG. 1. The flowchart in FIG. 2 outlines an example embodiment of email address validation program 114 in assessing the accuracy of the user entered email address by: (i) determining whether the intended recipient's role or job has changed since the user last contacted the same recipient and recommending to change the recipient's email address to an updated email address(es) of a person(s) that now have that role; (ii) checking the content of the email and identifying potential recipients and suggesting to add them as an additional recipients; (iii) checking the email address(es) for possible spelling errors and updating the email address accordingly; and (iv) determining whether the email content is intended to be a secure transmission by analyzing its content and if yes, alerting and suggesting to remove the recipient if the email address of the recipient is not found in the user's sent folder.

According to example embodiment, validation program identifies an intended recipient email address(es) (step 205). In the example embodiment, validation program identifies and compares the intended recipient's email address(es) to the corporate directory and user mailbox in order to assess email address validity and suggest substitutions or corrections of the email address to the user if necessary. The identification of the recipient's email address may be performed in either (i) real time (while the user is typing or entering the email address) or (ii) when the user intends to send the email (i.e. by pressing the send button). In embodiments which identify recipient's email address in real time, validation program may further suggest to add, delete, or correct the email address by, for example, opening a drop down menu with suggestions, or by auto-correcting a matching recipient's email address based on corresponding role or job title. In other embodiments, validation program may process multiple email address entries in the same way as a single email address by analyzing each one of them and giving suggestions after analyzing all of the email addresses identified by the validation program. In further embodiments, for example, when validation program is not integrated to the email program or service, it may identify an email address entered by the user by using a real-time analysis of the input device (such as keyboard) or an IO stream of the device (operating system). For example, email identification may be performed by the validation program anytime when the user enters a "@" symbol the validation program may extract the email address by recovering the text directly before and after the symbol. In further embodiments, validation program may determine the recipient's email address by using a natural language processing or optical character recognition algorithms.

In accordance with an embodiment, validation program determines if the recipient's role or job title (hereinafter "position") has changed (decision 210). In order to assess whether the recipient is the intended recipient, the validation program determines if the recipient has a new position in order to ensure that an email which is intended for a specific position holder, rather than a specific person, reaches the appropriate inbox. In the example embodiment, validation program checks the recipient's records of roles and job titles in corporate directory 142, located on server 140, via network 198. In other embodiments, the validation program may access other databases that contain at least email addresses, and position records including corresponding dates the individual took or quit his position. Alternatively, validation program may track the changes in the recipient's position from the local mailbox of the user, should the mailbox contain this information. After identifying records of the intended recipient's position and dates from the corporate directory, validation program determines if the position change occurred after transmission of the most recent correspondence between the user and the recipient.

In another embodiment, the validation program may compare whether the recipient's position has changed within a specific duration of time that was either pre-defined by the validation program or prioritized by the user. For example, if the duration was set to 30 days, the validation program checks whether the recipient's position has changed within the last 30 days. For example, if the user inputs Alpha's email address as an intended recipient and the validation program determines Alpha's position from the corporate directory 142 as an IT specialist, validation program 114 then determines whether Alpha is still the current IT specialist. If his position has changed, the validation program determines if his position changed before or after the user transmitted a previously sent email to Alpha.

In example embodiment, if the validation program determines that the recipient's position has changed (decision 210, "YES" branch), then validation program determines and stores recommendation to add new recipient email address(es) of one who currently holds the position of the original recipient before it was changed and stores recommendation to replace recipient's email address (step 215). The determination and storage of the replacement recipients is leveraged when making future recommendations, to the user, to change the intended recipient before email transmittal. In other embodiments, validation program may make a suggestion right away without storing the email addresses. In accordance with the embodiment, validation program searches corporate directory 142 or other relevant email databases for the recipients who currently hold intended recipient's position before the change and stores their names and email addresses as replacement recipients in order to recommend them to the user. For example, if the user enters Alpha's email address who was an IT specialist when the user last contacted him by email, the validation program will search the corporate directory 142 and determine that Alpha is no longer holding the IT specialist position (i.e. his job title is different). Then validation program will search and determine replacement recipients' names and email addresses of the individuals from the corporate directory 142, preferably from the same geographic location whose job title is an IT specialist. If the validation program determines from the corporate directory that IT specialist position was split between Beta and Gamma, the validation program will determine and store both emails with the recommendation to add Beta and Gamma as replacement recipients and remove Alpha as an intended recipient.

If validation program 114 determines that the recipient's role or job title has not changed (decision 210, "NO" branch) or if validation program already determined and stored recommendation to add new recipient email address(es) (step 215), validation program proceeds to determining whether the email content includes names, roles, or job titles of any potential recipients that are not on the intended recipients list of addresses (decision 220). This determination is required in order to validate and suggest to the user to add or remove recipients according to the email content. In the example embodiment, validation program determines whether email content includes names or positions by comparing the content of the email to corporate directory 142 and determining potential recipient's email address. The determination of names and positions of the potential recipient's email address and his position may be made for example, by utilizing string matching, and/or natural language processing when comparing email content to corporate directory 142. Continuing the example above, if validation program determines John Doe name appears in the content of the email, validation program will check if John Doe appears in the corporate directory and has an email in corporate directory 142, then validation program continues to determining if the user sent him email transmissions before (decision 225).

If validation program determined that email content includes names, roles, or job titles related to potential recipients who are on the corporate directory 142 (decision 220, "YES" branch), then validation program checks if the user sent any email transmissions previously to that potential recipient, (decision 225). In addition, validation program determines whether potential recipient's email address appears in the user mailbox by referencing email program 112. For example, if the email contained John Doe, who was not a recipient, the validation program will reference corporate directory and then check the mailbox to determine that the user sent any email transmission to John Doe's before.

If any email was previously sent to potential recipient with the determined name, role, or job title (decision 225, "YES" branch), then validation program determines and stores recommendation to add new recipient (potential recipient's) email address(es) (step 230). In the example embodiment, determining that the recipient has received an email from the user before is an indication that the email should be transmitted to potential recipient and the validation program will suggest to add the user as the potential recipient. Continuing the previous example, after determining that "John Doe" is present in the content of the email, determining that John Doe is in the corporate directory 142, and that the user has previously sent an email to John Doe, the validation program will store John Doe's email address to suggest it to the user before the email will be transmitted. In other embodiments, validation program may only reference the corporate directory and if the potential recipient is in it suggest to add him to the user without checking the user's mailbox.

If the email content does not contain a name, role or job (decision 220 "NO" branch), an email has not been previously sent to the name, role, or job (decision 225 "NO" branch), or validation program already determined and stored the potential recipient email address (step 230), then validation program determines whether intended recipient's email address exists in a mailbox or corporate directory (decision 235). If recipient's email address may be found in corporate directory 142 then it is an indication that the email is being transmitted to existing recipient or the user made an error in entering the recipient's email address. In the example embodiment, this validation of recipient's email address is performed by searching corporate directory 142 via network 198.

If the validation program finds that the intended recipient's email address does not exist in a mailbox or corporate directory (decision 235, "NO" branch), the validation program checks whether the email address was incorrectly spelled (decision 240). In the example embodiment, the validation program will check the email address for errors by comparing it to the email addresses stored in the corporate directory 142 and in the mailbox of the user by running, for example, a fuzzy string searching algorithms and determining by approximation the correct email address(es). For example, if the user entered an email address of John Doe as "johndo@abcde.com" the validation program will search the corporate directory and utilize fuzzy string searching algorithms in order to determine that the closest email address with the least addition or deletion of letters as possible.

If the validation program discovers that the intended recipient's email address is spelled incorrectly (decision 240, "YES" branch), the validation program determines and stores recommendation to add new recipient email address(es) (step 245). For example, if the closest email address name to the misspelled address in the corporate directory 142 will be "johndoe@abcde.com", the validation program will store and suggest this email to the user.

If the recipient's email address exists in the mailbox or corporate directory (decision 235, "YES" branch), the validation program may not determine that the email address was incorrectly spelled (decision 240, "NO" branch), or after determining and storing the correct email address (step 245), then validation program checks whether the email content is intended to be secure (decision 250). In accordance with an example embodiment, the validation program searches the content of the email for pre-defined keywords or flags that trigger the validation program to treat the current email as intended to be a secure transmission. In the example embodiment, the pre-defined keywords may be stored on a database, server 140, or locally on user device 110. For example, validation program utilizes string matching techniques to compare the content of the email to a database containing a pre-defined set of keywords. If any of the content of the email matches one or more keywords contained in the database, the email is flagged as secured. For example, if the content of the email contains words such as: "confidential", "secret", which are also contained within the database of pre-defined keywords, validation program identifies the email content as intended to be a secure transmission (flagged as secured). Alternatively, if validation program determines that the secure flag associated with the email was turned on by the user (in the email application), validation program identifies the email content as intended to be a secure transmission.

According to the example embodiment, if the email content is identified as intended to be secure (decision 250, "YES" branch), then validation program checks whether the recipient's email address exists in the user's sent mail folder (decision 255). By checking if any email was previously sent to the intended recipient, validation program reaffirms that the intended recipient is the correct recipient. If the recipient's email address does not exist in the mailbox (decision 255, "NO" branch) the validation program proceeds to remove the recipient's email address from the intended recipients (step 260).

According to the example embodiment, validation program removes the recipient's email address from the intended recipient list. In another embodiment, validation program may suggest to remove the recipient's email address and remove it only after the user approves or reaffirms the removal. In further embodiments, if the user chooses to remove the intended recipient, validation program will update its internal database that the removed email is not intended for secure content, and reference the database whenever the email content is intended to be secure.

In accordance with an embodiment, if the validation program identifies that the email is not intended to be secure (decision 240, "NO" branch) or the email is intended to be secure but recipient's email address exists in a mailbox (decision 255, "YES" branch), or when proceeding after removal of the intended recipient's email address (step 260), the validation program proceeds to making a final recommendations to the user (step 265) based on previously determined and stored email addresses and recommendations (from steps 230, 245, 260). In the example embodiment, the validation program arranges the potential recipient's names and corresponding email addresses alphabetically, removes the duplicate addresses and presents them to the user. For example, the presentation to the user may be as a dropdown menu, a pop-up window or direct field insertion or traverse of the email address in the case when validation program suggests to remove the email address as incorrectly spelled or not appropriate. In another embodiment, the validation program may include reasons for making the recommendations and allow the user to make an informed decision based on these reasons. In further embodiment, the validation program may allow the user to change, correct or reject the recommendations and the validation program will store these preferences and apply them in the future analyses.

The descriptions of the various embodiments of the present invention i.e. whether to run the validation program in real time or after the user intends to send the email, whether the validation program checks only corporate directory or other accessible databases, whether the validation program is located on the user device 110 or on server 140 have been presented for purposes of illustration, but are not intended to be exhaustive or limited to the disclosed embodiments. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 3:
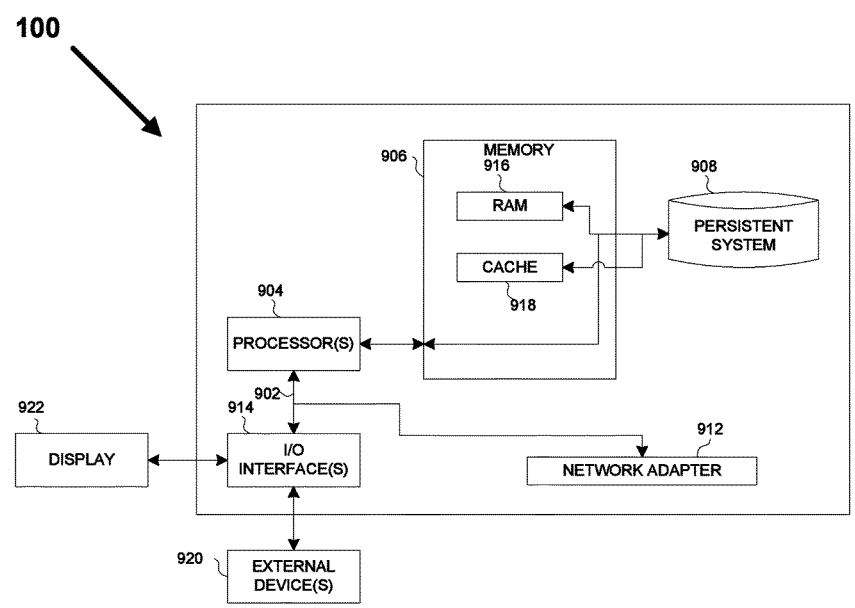
FIG. 3 is a block diagram depicting the hardware components of the email address validation system of FIG. 1, in accordance with an embodiment of the invention.

FIG. 3 depicts a block diagram of components of a user device 110 and server 140, in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

A user device 110 and a server 140 include communications fabric 902, which provides communications between computer processor(s) 904, memory 906, persistent storage 908, communications unit 912, and input/output (I/O) interface(s) 914. Communications fabric 902 may be implemented with any architecture designed for passing data and/or control information between processors (such as microprocessors, communications and network processors, etc.), system memory, peripheral devices, and any other hardware components within a system. For example, communications fabric 902 may be implemented with one or more buses.

Memory 906 and persistent storage 908 are computer-readable storage media. In this embodiment, memory 906 includes random access memory (RAM) 916 and cache memory 918. In general, memory 906 may include any suitable volatile or non-volatile computer-readable storage media.

The validation program and email program 112 in user device 110, and corporate directory 142 in server 140 are stored in persistent storage 908 for execution by one or more of the respective computer processors 904 via one or more memories of memory 906. In this embodiment, persistent storage 908 includes a magnetic hard disk drive. Alternatively, or in addition to a magnetic hard disk drive, persistent storage 908 may include a solid-state hard drive, a semiconductor storage device, read-only memory (ROM), erasable programmable read-only memory (EPROM), flash memory, or any other computer-readable storage media that is capable of storing program instructions or digital information.

The media used by persistent storage 908 may also be removable. For example, a removable hard drive may be used for persistent storage 908. Other examples include optical and magnetic disks, thumb drives, and smart cards that are inserted into a drive for transfer onto another computer-readable storage medium that is part of persistent storage 908.

Communications unit 912, in these examples, provides for communications with other data processing systems or devices. In these examples, communications unit 912 includes one or more network interface cards. Communications unit 912 may provide communications using one or both of physical and wireless communications links. The validation program and email program 112 in user device 110, and corporate directory 142 in server 140 may be downloaded to persistent storage 908 through communications unit 912.

I/O interface(s) 914 allows for input and output of data with other devices that may be connected to user device 110 or server 140. For example, I/O interface 914 may provide a connection to external devices 920 such as a keyboard, keypad, a touch screen, and/or some other suitable input device. External devices 920 may also include portable computer-readable storage media such as, for example, thumb drives, portable optical or magnetic disks, and memory cards. Software and data used to practice embodiments of the present invention, e.g., the validation program and email program 112 in user device 110, and corporate directory 142 in server 140 may be stored on such portable computer-readable storage media and may be loaded onto persistent storage 908 via I/O interface(s) 914. I/O interface(s) 914 may also connect to a display 922.

Display 922 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium may be a tangible device that may retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that may direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

What is claimed is:

1. A method for an email address validation, the method comprising:
    identifying an email address of a recipient listed in an email;
    determining whether the email address is erroneous, wherein determining whether the email address is erroneous comprises determining a position of the recipient has changed, determining an email address is erroneous, and determining a confidentiality mismatch;
    wherein determining the position of the recipient has changed comprises:
        determining a current position of the recipient;
        determining a previous position of the recipient, wherein the previous position comprises one or more of: a position of the recipient at a date of a previous email transmission, and a position of the recipient at a predetermined date;
        determining whether the current position is the same as the previous position;
        based on determining that the current position is not the same as the previous position, determining a new email address of a new recipient based on the previous position;
        determining that the email includes one or more predefined specific words, wherein the predefined specific words are associated with a new position that is not a current position of the recipient;
        determining a new email address based on the new position;
    wherein determining the confidentiality mismatch comprises:
        determining that the email includes one or more predefined specific words, wherein the predefined specific words are associated with confidentiality;

based on determining that the email address has not been previously sent by a user, displaying a recommendation to a user;
wherein determining the email address is erroneous comprises:
   determining the email address is not in a database;
   determining a similar email address in the database comprising one or more of:
      determining the similar email address by string matching the email address to the database;
      determining the similar email address by pattern matching the email address to the database;
      determining the similar email address by approximate string matching the email address to the database; and
based on determining that the email address is erroneous, displaying a recommended email address to a user, wherein the recommended email address is one or more of: the new email address of the new recipient, the similar email address, the email address of the recipient.

* * * * *